United States Patent [19]

Knox

[11] 4,246,614
[45] Jan. 20, 1981

[54] BINARY GRAPHIC PRINTER SYSTEM HAVING AN ELECTRONIC SCREEN WITH SHIFT CONTROL SUITED FOR RESCREENING

[75] Inventor: Keith T. Knox, Rochester, N.Y.

[73] Assignee: Xerox Corporation, Stamford, Conn.

[21] Appl. No.: 107,282

[22] Filed: Dec. 26, 1979

[51] Int. Cl.³ .............................................. H04N 1/40
[52] U.S. Cl. ..................................... 358/283; 364/515
[58] Field of Search ................. 358/283, 298; 364/515

[56] References Cited

U.S. PATENT DOCUMENTS

| | | | |
|---|---|---|---|
| 3,373,437 | 3/1968 | Sweet | 346/75 |
| 3,604,846 | 9/1971 | Behane | 358/298 |
| 4,027,961 | 6/1977 | Starkweather | 358/300 |
| 4,032,978 | 6/1977 | Wong | 358/283 |
| 4,040,094 | 8/1977 | Everett | 358/283 |
| 4,046,471 | 9/1977 | Branham | 358/283 |
| 4,051,536 | 9/1977 | Roetling | 358/298 |
| 4,149,194 | 4/1979 | Holladay | 358/283 |

OTHER PUBLICATIONS

Allenbach, J. P. et al., "Random Quasiperiodic Halftone Process", *Journal of the Optical Society of America*, vol. 66, No. 9, Sep. 1976, pp. 909-917.

*Primary Examiner*—Howard W. Britton
*Attorney, Agent, or Firm*—Michael H. Shanahan

[57] ABSTRACT

Ink jet and xerographic binary graphic printers are disclosed which make reproductions by marking the pixels within a raster pattern on a copy sheet with a high or low density (e.g. black or white) mark in response to electrical printing signals. The printing signals are generated by comparing the magnitude of video signals representative of a continuous tone raster image with electrical screen signals organized into halftone cells according to a pattern. A shift circuit processes received video signals and identifies the center of the black (or white) video signals within the confines of a screen halftone cell. The pattern of screen signals within a halftone cell is shifted to the center of the black video signals. The cell shifting suppresses beat frequencies in reproductions of originals containing screens or image detail with frequencies near that of the electrical screen.

11 Claims, 4 Drawing Figures

BINARY GRAPHIC PRINTER SYSTEM HAVING AN ELECTRONIC SCREEN WITH SHIFT CONTROL SUITED FOR RESCREENING

BACKGROUND

This invention relates to electronic reprographic systems that make copies in response to electrical printing signals and that have electronic screening or halftoning capabilities. In particular, this invention relates to electronic method and apparatus for screening previously screened images, i.e. rescreening.

Rescreening of the type to which the present invention is primarily directed occurs, for example, when a screened original (e.g. a printed picture or a typewritten document) is raster scanned by an electronic scanner to generate video signals representative of the original. The video signals are in turn electronically screened by combining them with screening signals to produce printing signals. A copy is made of the original by applying the printing signals to a binary graphic printer to create a copy which is a facsimile of the screened original. If the spatial frequency of the screen in the original differs from that of the electronic screen, the copy is distorted by beat frequencies related to the difference between the two spatial frequencies.

The motivation for including an electronic screen in electronic reprographic equipment is to make good quality facsimiles of continuous tone black and white or color originals such as monochrome (e.g. black and white) or polychrome (e.g. yellow, magenta and cyan) photographic prints or transparencies. The resultant copy is often referred to as a "first generation" copy. Often, a first generation copy is reproduced on the same reprographic equipment on which it was made. This copy of the copy is referred to as a "second generation" copy. (A copy made of the second generation copy is called a "third generation" copy and so on.) The second and subsequent generation copies are rescreened images.

The screen frequency in a "subsequent generation" copy is near but not equal to that of the earlier generation copy from which it is made. An electronic scanner distorts an image of an original to some degree. Distortion of the image is also caused by the printing mechanism in a particular reprographic machine due to parameters such as the spread of a liquid ink or dry toner on paper. In addition, a small magnification, either an enlargement or reduction, of about one to two percent is frequently desired in a reprographic machine and the magnification causes the spatial frequency of the copy to differ from the original even though the "original" is made on the same machine.

Many screened and continuous originals of course exist in today's society which have spatial frequencies near that of an electronic screen in reprographic machines. Examples of such originals are pictures, graphs and the like in newspapers, magazines and commercial offset press materials, e.g. a corporate annual report.

SUMMARY

Accordingly, it is a main object of this invention to overcome the foregoing limitations.

A special object of this invention is to enable a reprographic machine having an electronic screen to make good quality copies of its own copies.

Another object herein is to improve the quality of copies made of screened originals on reprographic equipment including an electronic screen.

Specifically, it is an object of this invention to suppress beat frequencies in a copy made with a reprographic system having an electronic screening capability arising due to the difference in spatial frequency (or wavelength) between the screen in an original and the electronic screen in the reprographic system.

Still another object is to improve the quality of second and subsequent generation copies made on a reprographic machine having an electronic screen when the original is a first generation copy (or other generation copy) made on the same or like machine.

Yet a further object of the invention is to device methods and apparatus for aligning or shifting an electronic screen in a reprographic machine to the screen in an original to be copied.

The foregoing and other objects of the invention are achieved by detecting the locations of the centers of video data within the confines of the halftone cells in the screen and shifting the corresponding halftone cell in the electronic screen so its center is aligned to that of the video data.

The centers of the video data or signals within the screen cell are located by examining the video signals generated from a raster scan of the original. A raster scan is a process in which small areas of the original called pixels are examined to determine their optical reflection or transmission density. An analog or digital signal representative of the magnitude of the reflection or transmission density—hereafter image density—is created for each pixel. The entire document or original is divided into contiguous pixels. A common raster pattern is one in which a plurality of pixels are aligned linearly to form a row across the original and the rows are repeated over the length of the original. A row is referred to as a scan line and the total collection of scan lines that cover the area of the original to be reproduced is referred to as the raster image.

A screen includes a two dimensional pattern in an original or an equivalent pattern in the video signals comprising a raster image. The pattern is analogous to the wire mesh screen from which the term screen is derived. A screen slices a continuous original into discrete regions called halftone cells. The cells are at least equal to the size of a pixel but practically encompass multiple pixels. Conveniently, the cells herein are referred to as $m \times n$ matrices of pixels where the smallest meaningfully practical cell is a $2 \times 2$ matrix of pixels. More practically, halftone screens suited for most current electronic reprographic equipment are those having cell sizes in the range of from about $4 \times 4$ to about $10 \times 10$ matrices.

An electronic halftone cell conventionally includes a collection of screen signals corresponding to pixels in the original and video signals in a raster image. The screen signals have values that represent an image density and they are logically associated in patterns corresponding to a halftone cell that divide or separate a continuous image into discrete regions. The function of a screen signal is to be combined with a corresponding video signal. For example, the combining step involves comparing the magnitudes of the screen and video signals to generate a "screened" printing signal representative of either one of two binary image densities such as black and white. The printing signal in turn is applied to a printer mechanism to set a pixel element on a graphic medium, e.g. a copy sheet, to one of two binary density levels, e.g. black or white.

In the present invention, the center of the "black", for example, video signals within the boundaries of a screen cell is detected and the center of the halftone screen cell is shifted—if necessary—to align it to the center of the "black" video signals. The "black" center is detected by summing the values of the video signals in all the pixels in the rows and columns making up a screen cell. The peak values of the sums identify the "black" center of the cell. Alternately, the center of the "white" video signals may be detected depending on whether the system writes white on black or black on white.

PRIOR ART STATEMENT

The U.S. Pat. No. 4,051,536 to Paul G. Roetling is useful in correcting image defects associated with screening a previously screened image. In that patent, the density of pictorial signals are averaged over a period of the halftone screen and the average is used to change the percent of white to black within the halftone dot. However, there is no disclosure in this patent relating to the shifting of the center of a halftone cell within an electronic screen to correct for image defects.

The U.S. Pat. Nos. 3,604,846 to Behane, 4,032,978 to Wong and 4,040,094 to Everett et al disclose various halftone or screening techniques. None of these, however, address the problem of shifting the center of a halftone cell within an electronic screen to correct for image defects.

THE DRAWINGS

Other objects and features of the invention are apparent from the present specification taken alone and in combination with the drawings which are:

FIG. 1 illustrates the benefit offerred by the present invention. The center row of 8×8 squares represent halftone cells in a screened original. The 4×4 squares within the 8×8 cells represents the "black" (or in the alternative "white") video signals or graphics within the cells. The upper row of 6×6 squares represent the cells in an electronic screen that screens the original represented by the 8×8 cells. The screen is not shifted resulting in a distortion to the "black" data in the original as represented by the cross-hatched areas within the upper 6×6 cells. The lower row of 6×6 squares represents the same as the upper row but with the center of the cells shifted toward the center of the "black" data according to the present invention. The cross hatched areas show an accurate reproduction of the original with the distortion of the unshifted screen suppressed.

DETAILED DESCRIPTION

Figure 3:
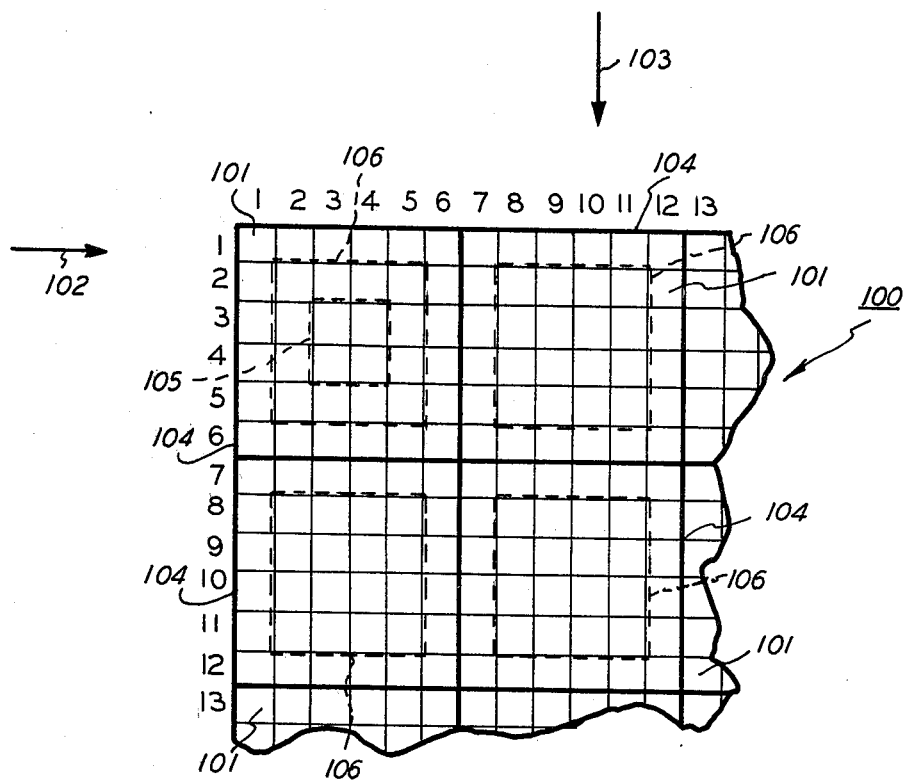
FIG. 3 is a partial illustration in plan view of a rectangular raster pattern which define pixel elements, halftone cells and cell centers.

The format used herein for discussing electronic screening is best understood by reference to FIG. 3. All images, including, graphic originals, and electronic representations of originals and the electronic screens described herein are logically ordered in a raster pattern. A rectangular raster pattern is described as an example but other raster patterns can be used.

Raster 100 in FIG. 3 depicts the format for the rectangular raster used herein. It is made up of contiguous pixels represented by the small squares 101 which are arranged in rows or scan lines 102 and columns 103. The raster extends in two dimensions over an area of interest. Each pixel is unique and is identified by its row and column number starting from the upper lefthand corner as indicated.

The larger squares 104 represent the halftone cells or dots of a screen. The shape of the cells 104 is square by way of example but they can be rectangular. The conventional representation of a cell is as an m×n matrix. In FIG. 3, the cells are 6×6 matrices or groupings of pixels 101.

Each pixel 101 in an original has some optical reflection or transmission density (image density) which is continuous in nature. Electronic video signals representative of the image density may be either analogue or digitial. Herein, all electrical video, screening and printing signals are in a digital form but could be in analogue form. Specifically, the video and screen signals, by way of example, are eight bit binary numbers having a range of values from 0-255. The printing signals used herein, by way of example, are one bit binary numbers of values 0 and 1 representing a low and high density (e.g. white and black) for a pixel in a reproduction of an original. In this example, white is zero and black is 255.

Video signals are created: artifically by electronic devices such as from a keyboard or computer program; by optical devices such as a scanner that measures the optical density of discrete areas of an original corresponding to a pixel; by a combination of these two; or by other suitable means. For the present description, the video signals are generated or are made available to the present system sequentially in a scan line by scan line format corresponding to raster pattern 100 in FIG. 3.

A screen signal exists for every pixel in a raster pattern. Each screen signal is scaled in units of the video signal and is combined with a video signal to form a printing signal. The combining step is also the screening step and conventionally includes comparing the magnitudes of the video and screen signals. The printing signal is set to one of its two binary states based on the comparison. For example, the printing signal may be set to its 1 state when the video signal is equal to or greater than the screen signal and causes a white pixel on a graphic reproduction to be marked black.

For an explanation of an electronic screen, the reader is referred to U.S. Pat. No. 4,149,194 to Thomas M. Holladay. The following simplified electronic screen description is intended to illustrate the advantages of the present cell shifting technique. In practice, the structure of electronic screens is much more complex. Briefly, each screen cells 104 in FIG. 3 contains the same collection of screen signals at the same locations within a cell. The values of the screen signals are conventionally selected so that a cell grows from all white to all black (or vice versa) from the middle outward. This means that, for example, the screen signals associated with the four center pixels, e.g. those within the dashed line square 105, have lower values than the intermediate screen signals associated with the pixels between the dashed lines 105 and 106. The outer screen signals associated with the pixels in the outer regions between the dashed lines 106 and the boundaries of the cell 104 have the highest values. Printing signals are set black in the outer region only when the video signals are at a very high density level or not at all. For the present purposes of describing the invention, the outer screen signals are set to a level to force all printing signals to be white.

Figure 1:
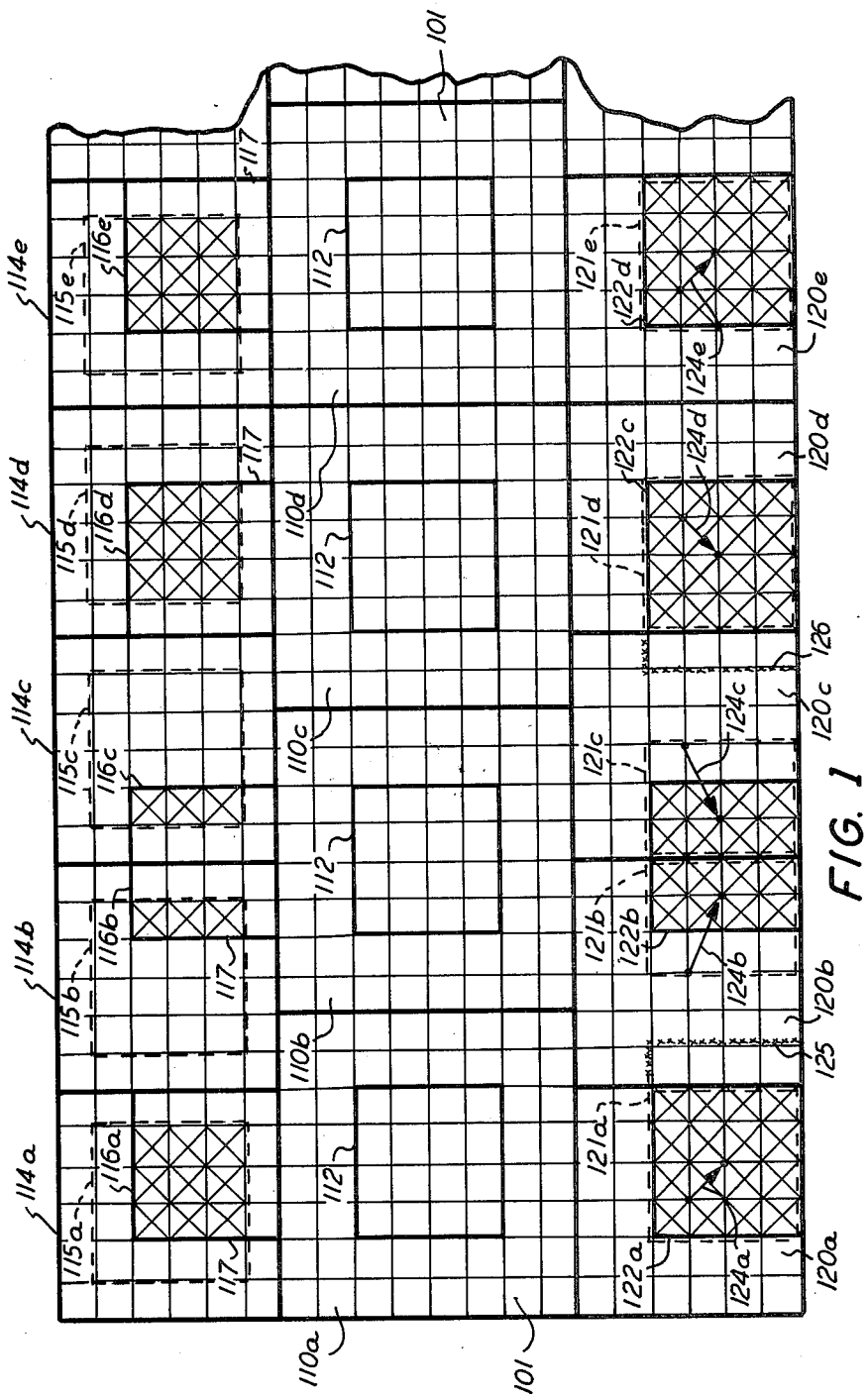
Figure 2:
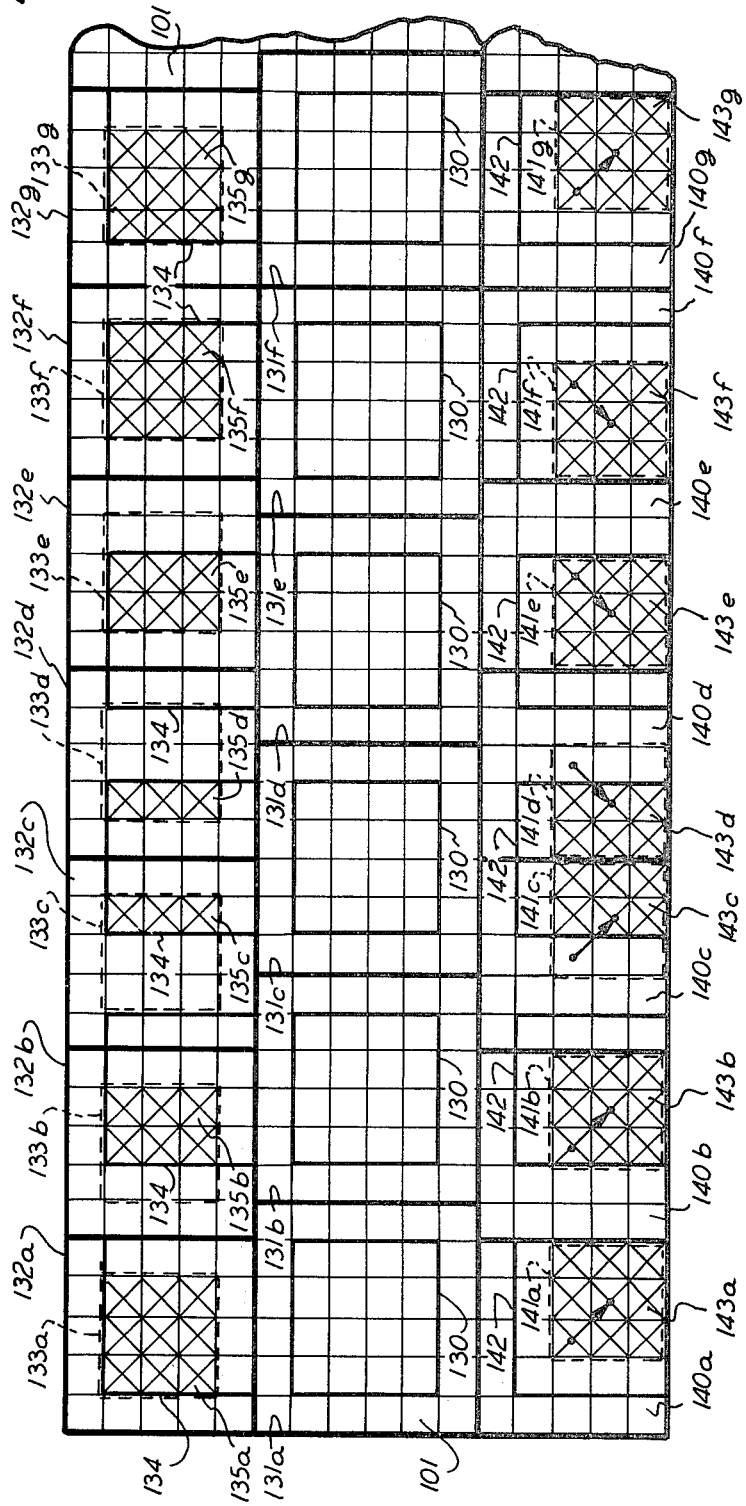
FIG. 2 illustrates the same comparison as FIG. 1 except the original in the center row is made up of 6×6 cells, the upper unshifted screen of 5×5 cells and the lower shifted screen of 5×5 cells.

With these definitions, reference is now made to FIGS. 1 and 2. The squares 110a, b, c and d respresent halftone cells in an original screened image which is to be rescreened. The smallest squares 101 (as in FIG. 3) represent pixels in the original, corresponding video signals and screen signals. All signals occur sequentially in time in a left to right order for each row starting at row 1, column 1. The original 110a–d is made with an 8×8 cell with the sixteen center pixels within squares 112 set black and the rest of the pixels white.

The squares 114a, b, c and d represent electronic screen halftone cells which have 36 screen signals that are compared with the video signals associated with cells 110a, b, c and d to produce printing signals. As explained earlier, the outer screen signals associated with the pixels between dashed line square 115 and the cell boundaries 114 are set to a maximum value to force the printing signals to white. Consequently, the group of pixels within the cross-hatched square represent the printing signals set to black when the screen signals are compared to the video signals. The cross-hatched area is the area of intersection of the region within square 115 and squares 117. Squares 117 are the pixel locations corresponding to black image densities in the originals, i.e. corresponding to squares 112.

An examination of cells 114a, b, c, d and e illustrates the distortion to a reproduction due to rescreening. The wavelength of the screen in the original is 8 pixels per cell and that of the electronic screen is 6 pixels per cell. Consequently, the reproductions 116a–e do not correspond to the squares 112a–d in the original. The copy is distorted.

The present invention includes the shifting of the screen pattern within a screen cell to a location at or near the center of the high density areas of the original. In other words, the square 115 is shifted so its center coincides as near as possible with the center of the square 117 containing the black pixels.

The squares 120a–e, represent the same electronic screen as that of squares 114a–e, except the centers of the cells (dashed lines 121a–e) are shifted from the geometric center of the cells to the center of the video signal grouping. The cross-hatched areas 122a–e represent those pixels at which a "black" printing signal is generated due to a comparison of like addressed video and screen signals. The arrows 124a–e represent the shift of a center of a cell from an original to a new location.

The screen cells are all the same and as such are preferably generated in a cyclic fashion as described in the patent to Holladay U.S. Pat. No. 4,149,194 mentioned earlier. As a result, that portion of a cell apparently shifted out one side or edge of a cell appears at the opposite edge. For example, the rectangle 125 in cell 120b is the recirculated portion of cell center 121b apparently lost at the right edge of the cell when the cell center 121b is shifted to the location shown. Likewise, the rectangle 126 in cell 120c is the recirculated portion of cell center 121c apparently lost at the left edge of the cell when the cell center 121c is shifted to the location shown.

The four pixels around the tip of the arrow head on arrow 124a have screen signals whose magnitudes correspond to those within the square 105 in FIG. 3. The pixels adjacent that center grouping 105 have larger magnitudes and the remaining pixels within the cells have the highest values that effectively force all corresponding printing signals to a "white" state (for example). Consequently, the centered screen signal structure, sensitivity pattern or growth pattern of cells 114a–e in FIG. 1 and cells 104 in FIG. 3 are shifted one pixel location in x (the I or row dimension) and one pixel in y (the J or column dimension) without otherwise disturbing the electronic screen. Note also that the shifting is on a cell by cell basis as compared to a shifting of the entire screen.

The printing signals generated by comparing the shifted screen signals and the video signals produce black marks on a binary graphic medium corresponding to the cross-hatched areas 123a–e. The areas 123a–e collectively reproduce the data or black areas 112a–d in the original 110a–d one hundred percent. The use of the present shifting technique totally eliminated the distortion due to the mismatch of screen cells 110a–d and 114a–e. The distorted reproduction is represented by the cross-hatched areas 116a–e.

The present scheme suppresses distortion due to mismatching of the wavelength of the screens in an original and the electronic screen doing the "rescreening."

Referring to FIG. 2, an original is represented by the "black" areas 130 within the halftone cells 131a–f. The original cells are 6×6 matrices. The electronic screen cells 132a–g are mismatched 5×5 cells having the center of the cell pattern within the dashed lines 133a–g. The squares 134 represent the "black" data superimposed with the screen cells. The cross-hatched areas 135a–g represent the "black" printing signals that are produced from the video and screen signals. These cross-hatched reproductions are a distortion of the original "black" data represented by the squares 130.

The cells 140a–g are the same 5×5 screen cells but with the centers shifted to the location indicated by dashed lines 141a–g. The arrows inside each cell indicate a one pixel shift in x and y dimensions made by the cells to align to the center of the "black" video data represented by squares 142. The cross-hatched areas 143a–g represent the "black" printing signals produced by comparing the black video signals with the "shifted" screen pattern. The cross-hatched areas 143a–g reproduce the original "black" data (squares 130) significantly more faithfully than the cross-hatched areas 135a–g in the unshifted screen cells 132a–g.

The foregoing describes the technique of shifting centers to suppress image distortion. The video signals, in practice, normally are multi-level or continuous tone in nature even when the original is made up of black and white pixel areas. An optical scanner creates continuous signals even from a two tone original. The scanner sees the edges between black and white and generates midtones. The effect of the optical scanner is to generate video signals that represent a "blurred" image of the original that is effectively a continuous tone image. The screen frequency is still present in the "blurred" image, however, and leads to image distortion as described.

The use of the shifting cell is also effective to decrease image defects from other sources even when the original is a true "continuous" tone image rather than a screened image. Often image detail contains spatial patterns at a frequency near that of the screen. Consequently, the present invention applies to unscreened images. Also, the techniques of the Roetling U.S. Pat.

No. 4,051,536 when combined with the present cell shifting technique yield even better quality images than when cell shifting is used alone. The disclosure of the U.S. Pat. No. 4,051,536 is hereby incorporated herein by reference.

Figure 4:
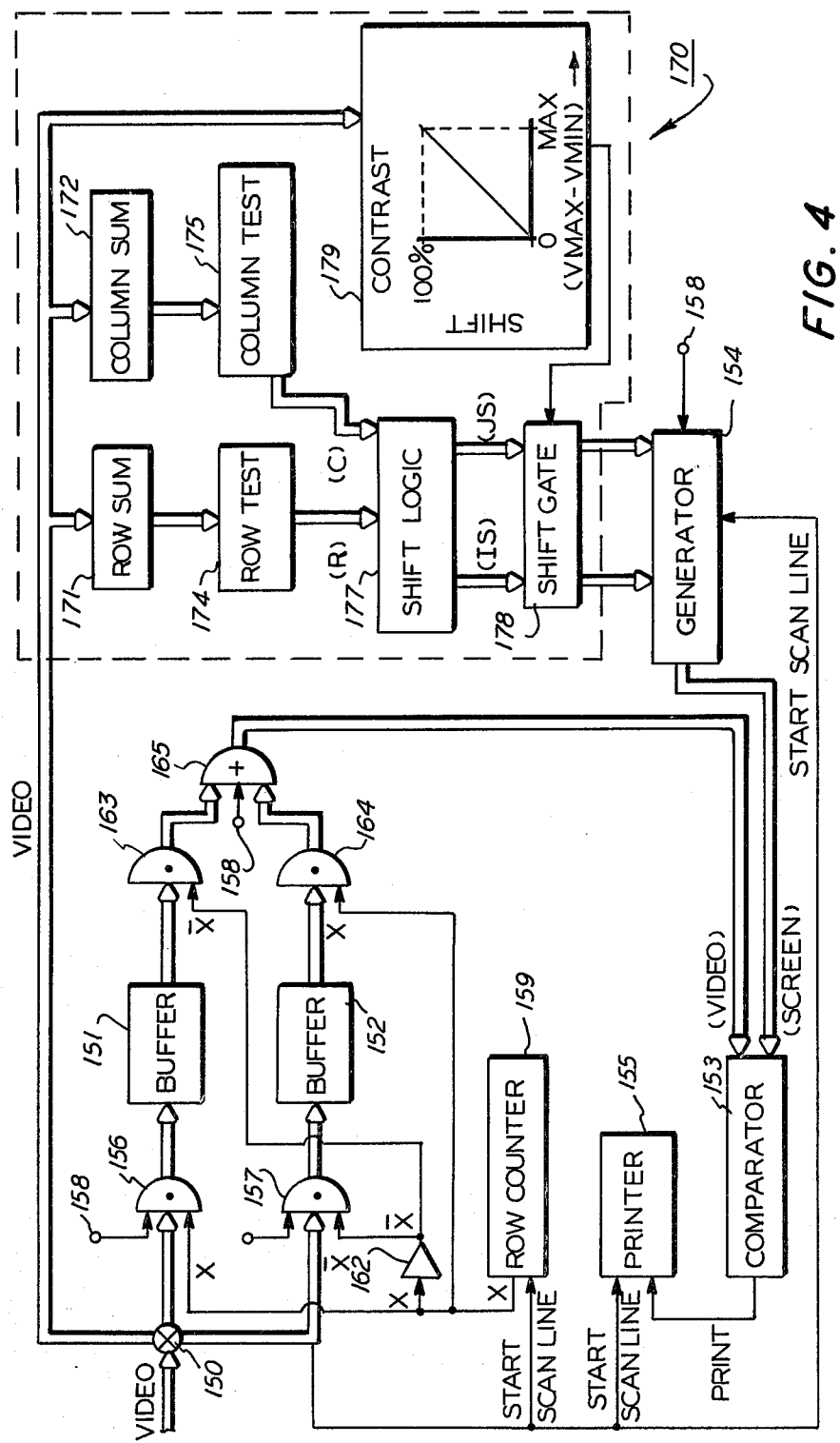
FIG. 4 is a schematic illustration of an electronic binary graphic printing system employing the screen shift method and apparatus of the present invention.

FIG. 4 depicts an electronic binary graphic printing system employing a shifting cell electronic screen according to this invention. Video signals received sequentially at terminal 150 represent the continuous tone densities of a screened original. The video signals are temporarily stored in either buffer 151 or 152 and are thereafter applied synchronously to combining circuit (comparator) 153 along with screen signals from screen generator 154.

Printing signals are generated at the output of the combining circuit 153 and applied to a binary graphic printer 155 at which a "rescreened" copy or reproduction is made of the original. The remaining portions of the system are for effecting the shift of the center of a screen cell to the center of the "black" video data (or to the "white" center when appropriate) within the confines of the screen cell as explained in connection with FIGS. 1 and 2.

The video signals arrive at terminal 150 on an eight line data bus, by way of example. All multi-line buses are depicted in the figure as a thick line. The video signals or data are routed to either buffer 151 or 152. While one buffer is being loaded with data, the video signals are unloaded from the other and processed to generate printing signals at the output of the combining circuit 153.

The video signals are alternately loaded into the two buffers by the logical AND gates 156 and 157. The video signals are gated by a system clock on line 158 and the outputs x and $\bar{x}$ from a scan line counter 159. The signal $\bar{x}$ is generated by inverter 162 which logically inverts the signal x from the counter 159. The counter is coupled to terminal 150 to receive a start of scan line signal that advances the counter by one count at the start of each scan line of the video signals. A unique signal is received at the terminal 150 along with the video signals to indicate the start of a scan line or row.

Counter 159 counts the number of scan lines that corresponds to the number of rows in a cell of the electronic screen. In the case of the 6×6 zero angle screens of FIG. 1, counter 159 counts out six scan lines of video signals. During the first six scan lines the output x of the counter 159 is logically "true" and $\bar{x}$ is "false" causing six scan lines of video signals to be routed into buffer 151 through gate 156 and their passage is blocked by gate 157 from buffer 152.

During the second six scan lines of video signals, the signal x is logically "false" and $\bar{x}$ "true." Consequently, the video signals are loaded into buffer 152. During the loading of buffer 152, the video signals in the previous six scan lines are unloaded from buffer 151 in a "first in first out" (FIFO) basis. The "unloaded" video signals are sequentially applied to the combining circuit 153 in the order they were received at the terminal. The video signals are compared to the screen signals from generator 154 by circuit 153 to produce the printing signals applied to the printer 155. The unloading of buffer 151 is controlled by AND gate 163 which is activated to pass the video signals to OR gate 165 when $\bar{x}$ is "true", i.e. when buffer 152 is being loaded. Similarly, AND gate 164 controls the unloading of buffer 152. Gate 164 is activated when x is "true", of buffer 152. Gate 164 is activated when x is "true", i.e. when buffer 151 is being loaded.

The video signals at terminal 150 are applied to the shift circuit 170 at the same time they are being routed into either buffer 151 or 152. The shift circuit 170 analyzes the video signals to locate the center of the "black" (or white) video signals within the region of a screen cell. When the "black" center of the video signals differs from the center of the cell, the location of the screen signals within a cell are shifted to effectively shift the center of the cell to coincide with the center of the "black" video signals.

The shift circuit 170 includes the row and column sum circuits 171 and 172. These circuits add the values of the video signals within the rows and columns of a screen cell. In the present example, the cell is a 6×6 matrix. The row circuit 171 adds every six consecutive video signals together during a scan line and stores the sum into one of six storage buffers assigned for each cell across the raster. After six lines of video signals are received by the row summing circuit, the buffers contain the six sums of the video signals associated with the six rows in each cell.

The column circuit 172 includes storage buffers for each column across the raster pattern. As the video signals are received they are added to the number in the column storage buffers. After six lines of video signals are received, the column storage buffers contain the sum of the video signals for each of the six columns in each cell.

The sums of the rows and columns of each cell stored in the summing circuits 171 and 172 are used to find the center of the "black" video signals. The center is the pixel location within a screen cell whose address is found by identifying the row R having the largest row sum and the column C having the largest column sum. The center can also be found by searching each row and column within a cell for the largest video signal. The use of the row and columns sums is preferred because of it immunity to randomly placed large video signals.

The stored row sums for each cell are fed from circuit 171 to the row test circuit 174 where the first row sum from the first cell is placed into a first test buffer and compared to successive row sums. When the comparison indicates that a subsequent row sum is larger than the previous row sum, the buffer value is replaced with the larger value. The row number of the row sum in the test buffer is stored and identified as the center row of the cell. If the test buffer magnitude is equal to (within some tolerance) to successive row sums, the row number of each of the equal value is stored and the row at the center of this grouping (if greater than two) is identified as the center row for the cell under test. The center row address or number is identified as row "R".

The column test circuit 175 has a test buffer like that of the row test circuit 174. The circuit 175 operates in the same fashion on the column sums as circuit 174 does on the row sums. The result of the search is the identification of the column address "C" for the largest column sum within a cell.

The address R and C are fed from circuits 174 and 175 respectively to the shift parameter circuit 177. The row R and column C numbers identifying the center of the "black" video signals within the boundaries of a cell within the electronic screen. The center of the cell is known and is identified as row "i" and column "j". The shift required to locate the center of the signal values in the cell over the center of the "black" (or white) video signals is given by the equations IS=R−i and JS=C−j. The parameters i and j are the row and column numbers marking the center of the cell. IS is an integer indicating the number of pixel positions in a row the cell screen signal values are to be shifted and JS is an integer indicating the number of pixel positions in a column the cell screen signal values are to be shifted.

The shifting formulae R−i and C−j are most applicable to cells having odd number of pixels wherein a single pixel defines the center of the cell. In cells having even numbers of pixels, the center of the cell is defined by an even number of pixels such as the four center pixels within the square 105 in FIG. 3. For large cells, for example an 8×8 cell, the formulae can be applied by merely selecting one of the four center cells as the i, j address and shifting according to the formulae. For small even cells, the pixel closest to the "black" data center is selected as the cell center. The closest pixel is found by calculating IS and JS four times using the four addresses for the four center pixels. The address associated with the smallest values for IS and JS is the closest pixel to the center of the "black" data.

The shift parameters IS and RS are applied to the screen signal generatore 154 through a shift gate 178. The gate 178 scales the amount of shift along a row (IS) or column (IJ) in response to a measurement of the contrast in density along the rows and columns respectively. Low contrast indicates a near uniform density over the cell thereby making a shift unnecessary.

The shift parameters IS and RS are applied to the screen signal generator 154 through a shift gate 178. The shift gate scales the magnitude of the shift proportionally to contrast. Contrast test circuit 179 calculates the scale factor for the shift gate 178. The contrast circuit 179 receives the video signals directly from terminal 150 into max and min buffers associated with each cell across the width of the raster. An incoming video signal is compared to the value in a max buffer and replaces the buffer value when it is larger. Likewise, an incoming video signal is compared to the value in a min buffer and replaces the buffer value when it is smaller. The final values in the max and min buffers associated with each cell across the raster are the maximum (Vmax) and minimum (Vmin) video signal values within each cell.

Contrast is Vmax-Vmin. The contrast is calculated for each cell across the raster. A contrast signal is fed to the shift gate that scales the amount of shift. For a given maximum contrast, the shift is scaled to 100 percent of the calculated values of IS and JS. For zero contrast, the calculated shift, if any, is made zero. At fifty percent contrast, the values of IS and JS are reduced in half. The graph associated with the contrast circuit 179 illustrates the linear scaling performed by the circuits 178 and 179.

The screen signal generator 154 is the type reported by Thomas M. Holladay in U.S. Pat. No. 4,149,194, the disclosure of which is hereby incorporated by reference into this application. Briefly, the generator contains a number of screen signal values corresponding to the number of screen signals within a cell. The screen signals are arranged into one or more groups in an order corresponding to their occurance within a scan line of a raster. The groups are repetitively cycled and shifted to create the full raster pattern. The shifting of the cell centers by some multiple of a pixel location is achieved by altering the pixel location at which the circulation of a group of screen signals is started.

The screen generator is able to produce screens at any angle. The present scheme for finding the center of the video data is modified when a non-zero angle screen is used. The row and column sums are scaled to correspond to the geometric shape of the cell angle.

Alternately, the generator 154 is a memory storage device containing the number of screen signals equal to the number of pixels in the repetitious portion of a raster. In the case of the 6×6 screens of FIGS. 1 and 3, the number of screen signals equals the number of pixels in a scan line or row times six scan lines. The stored screen signals are retrieved from memory sequentially for each scan line. The shift signal IS displaces the pixel address left or right in the scan line by the amount of the desired shift. Similarly, the shift signal JS displaces the pixel address up or down in the rows or scan lines by the amount of the desired shift. The shifts are made on a cell by cell basis. At the start of each cell, the screen signal retrieved is that from the normal, unshifted pixel location in the stored raster pattern of screen signals.

The combining circuit 153 is a comparator in the present example. As mentioned, the printing signal is a binary number that represents either a high or low (e.g. black and white) density level to the graphic printer 155. The high level is generated when the video signal is equal to or greater than the screen signal and the low level when less. Other known combining schemes include multiplying the video and screen signals by constants before comparing their magnitudes.

The binary graphic printer 155 in this example, is an ink jet printer of the type reported in the Sweet and Cumming U.S. Pat. No. 3,373,437 the disclosure of which is hereby incorporated by reference. Briefly, the printer includes a manifold having an array of small orifices or nozzles spaced a pixel spacing apart. The nozzle array extends in length the full width of the raster pattern. The cavity in the manifold contains a conductive fluid or ink under a high pressure that forces streams of fluid out the nozzles toward a target.

A piezoelectric crystal device in contact with the ink in the manifold oscillates at about 120 kilohertz. The oscillation excites the ink pressure at the same frequency and causes the formation of drops of equal size and spacing at the 120 kilohertz rate. Charging electrodes are located adjacent the point of drop formation for each stream of fluid from each nozzle. The printing signal from combining circuit 153 is switched from one charging electrode to the next in the array synchronously with the generation rate of the pixel signals. The start of scan line signal from terminal 150 is applied to the printer to synchronize the switching of the printing signal to the charging electrodes.

Each nozzle thereby places a drop on a pixel on a copy sheet if the printing signal is in its high state for that pixel. The target or copy sheet is moved normal to the nozzle array to print the balance of the rows in the raster pattern. The resultant reproduction is a "rescreened" image of a screened original represented by the video signals.

Various modifications are suggested by the foregoing description and are intended to be within the scope of this invention. For example, another suitable graphic printer is a laser scanning xerographic printer such as that reported by Gary K. Starkweather in U.S. Pat. No. 4,027,961. In that patent, herein incorporated by reference, a photoconductive belt has a laser spot sweep across its width at a rate synchronously with the generation of printing signals by combining circuit 153. The belt is uniformly charged. The printing signal turns the laser spot "on" and "off" at the various pixel locations. When the laser is "on" the belt is discharged. The discharged areas are thereafter made black by a toner material. The toner is thereafter transferred to plain white paper forming the reproduction of the original.

Another laser scanning xerographic printer suitable as printer 155 is that reported by Branham et al in U.S. Pat. No. 4,046,471 the disclosure of which is hereby incorporated by reference. The photosensitive member in this patent is in the configuration of a drum rather than a belt.

Also, the circuit elements of FIG. 4 can be replaced by a comercially available digital computer with appropriate memory. A software program is devised to execute the functions represented by the various circuits shown in FIG. 4.

I claim:

1. Binary graphic printing apparatus comprising
   binary graphic printing means for setting a pixel on a graphic medium to either its high or low image density state in response to a printing signal, the graphic medium having a reproduction of an original image made on it in a raster pattern of contiguous pixels,
   input terminal means coupled to receive video signals representative of continuous tone image densities of pixels in a raster pattern image of the original image to be reproduced,
   electrical screen signal generator means for generating screen signals representative of image density levels in the format of the raster pattern thereby defining an electrical screen including a plurality of like halftone cells having electrical screen signals organized at pixel locations therein in a centered pattern,
   combining circuit means coupled to receive video and screen signals for generating the printing signals applied to the graphic printing means for producing the reproduction of the original image and
   shift circuit means coupled to receive video signals in a quantity to locate the center of either high or low density video signals within a halftone cell of the screen and for generating shift signals applied to the screen generator means to shift the centered screen signals relative to the center of either the high or low density video signals within the boundaries of the cell.

2. The apparatus of claim 1 further including means for supplying video signals representative of a screened original image having a screen containing halftone cells different from cells produced by the electrical screen generator means.

3. The apparatus of claim 1 wherein the shift signals cause the shift of the centered screen signals toward the center of the high or low video signals within the cell.

4. The apparatus of claim 1 wherein the combining circuit includes a comparator means for generating printing signals representative of which of the video or screen signals is the greater.

5. The apparatus of claim 1 further including at least first and second buffer means for storing a number of scan lines of video signals encompassing at least one row of halftone cells and gate means for alternately loading and unloading video signals into and out of the two buffers.

6. The apparatus of claim 5 wherein the shift circuit means includes row sum means coupled to the input terminal to calculate the sum of the video signals in each row within a cell and column sum means coupled to the input terminal to calculate the sum of the video signals in each column within a cell.

7. The apparatus of claim 6 wherein the shift circuit further includes row test means for testing the row sums to identify the row with the largest row sum and column test means for testing the column sums to idenfity the column with the largest column sum.

8. The apparatus of claim 7 wherein the shift circuit further includes shift logic means having storage means for containing an address for the center of a screen cell and means for generating row and column shift signals related to the difference between the row and column addresses for the largest row and column sums and the stored cell center row and column address.

9. The apparatus of claim 8 wherein the shift circuit further includes contrast circuit means coupled to the input terminal for altering the row and column shift signals proportionally to the difference between the largest and smallest video signals within a cell.

10. The apparatus of claim 1 wherein the graphic printing means includes an ink jet printing means.

11. The apparatus of claim 1 wherein the graphic printing means includes a xerographic printer means including a photoconductive member exposed by a laser scanning means.

* * * * *